(12) United States Patent
Dogiamis et al.

(10) Patent No.: US 11,575,749 B2
(45) Date of Patent: Feb. 7, 2023

(54) LOW-WEIGHT SINGLE MM-WAVE DIELECTRIC WAVEGUIDE INTERCONNECT ARCHITECTURE IN AUTONOMOUS CARS

(71) Applicant: Intel Corporation, Santa Clara, CA (US)

(72) Inventors: Georgios C. Dogiamis, Chandler, AZ (US); Sasha N. Oster, Marion, IA (US); Adel A. Elsherbini, Chandler, AZ (US); Erich N. Ewy, Santa Clara, CA (US); Johanna M. Swan, Scottsdale, AZ (US); Telesphor Kamgaing, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 333 days.

(21) Appl. No.: 16/757,751

(22) PCT Filed: Dec. 30, 2017

(86) PCT No.: PCT/US2017/069158
§ 371 (c)(1),
(2) Date: Apr. 20, 2020

(87) PCT Pub. No.: WO2019/133020
PCT Pub. Date: Jul. 4, 2019

(65) Prior Publication Data
US 2021/0194966 A1 Jun. 24, 2021

(51) Int. Cl.
*H04B 1/3822* (2015.01)
*H04B 1/08* (2006.01)
(Continued)

(52) U.S. Cl.
CPC .......... *H04L 67/12* (2013.01); *B60R 16/0231* (2013.01); *B60R 16/03* (2013.01);
(Continued)

(58) Field of Classification Search
CPC ....... H04L 67/12; H04L 5/14; B60R 16/0231; B60R 16/03; B60R 16/023; G08C 23/06;
(Continued)

(56) References Cited

U.S. PATENT DOCUMENTS 5,942,944 A * 8/1999 Paolella .................... H01P 5/12
333/125
9,065,163 B1 * 6/2015 Wu ...................... H01P 11/002
(Continued)

OTHER PUBLICATIONS

International Search Report and Written Opinion dated Sep. 17, 2018 for International Patent Application No. PCT/US2017/069158, 13 pages.

*Primary Examiner* — Andrew Wendell
(74) *Attorney, Agent, or Firm* — Schwabe, Williamson & Wyatt, P.C.

(57) ABSTRACT

Embodiments include a sensor node, an active sensor node, and a vehicle with a communication system that includes sensor nodes. The sensor node include a package substrate, a diplexer/combiner block on the package substrate, a transceiver communicatively coupled to the diplexer/combiner block, and a first mm-wave launcher coupled to the diplexer/combiner block. The sensor node may have a sensor communicatively coupled to the transceiver, the sensor is communicatively coupled to the transceiver by an electrical cable and located on the package substrate. The sensor node may include that the sensor operates at a frequency band for communicating with an electronic control unit (ECU) communicatively coupled to the sensor node. The sensor node may have a filter communicatively coupled to the diplexer/combiner block, the transceiver communicatively coupled to the filter, the filter substantially removes frequencies from RF signals other than the frequency band of the sensor.

25 Claims, 7 Drawing Sheets

(51) Int. Cl.
*H04L 67/12* (2022.01)
*B60R 16/023* (2006.01)
*B60R 16/03* (2006.01)
*G08C 23/06* (2006.01)
*H01P 3/08* (2006.01)
*H04L 5/14* (2006.01)
*B60W 60/00* (2020.01)

(52) U.S. Cl.
CPC .............. *G08C 23/06* (2013.01); *H01P 3/08* (2013.01); *H04B 1/3822* (2013.01); *H04L 5/14* (2013.01); *B60W 60/00* (2020.02)

(58) Field of Classification Search
CPC ........... H01P 3/08; H04B 1/3822; H04B 1/08; H04B 1/0057; H04B 5/0043; B60W 60/00; H04W 4/38; H04W 84/16
See application file for complete search history.

(56) References Cited

U.S. PATENT DOCUMENTS

| | | |
|---|---|---|
| 2004/0036165 A1 | 2/2004 | Ammar |
| 2007/0103380 A1 | 5/2007 | Weste |
| 2012/0106537 A1 | 5/2012 | Yousefi et al. |
| 2014/0285293 A1 | 9/2014 | Schuppener et al. |
| 2016/0003173 A1* | 1/2016 | Okada .................. G01M 15/12 73/35.09 |
| 2016/0359547 A1* | 12/2016 | Bennett ............. H04B 7/15507 |
| 2017/0117938 A1 | 4/2017 | Henry et al. |
| 2017/0331159 A1* | 11/2017 | Keser ................. H01M 10/425 |
| 2018/0183561 A1* | 6/2018 | Dogiamis ............... H04B 3/52 |
| 2018/0204401 A1* | 7/2018 | Schuler ................. B60R 25/24 |
| 2018/0366592 A1* | 12/2018 | Lu ........................ H04B 1/0057 |
| 2019/0106318 A1* | 4/2019 | Dudley .................. B60P 3/228 |
| 2019/0204508 A1* | 7/2019 | Elsherbini ............ G02B 6/3857 |

* cited by examiner

LOW-WEIGHT SINGLE MM-WAVE DIELECTRIC WAVEGUIDE INTERCONNECT ARCHITECTURE IN AUTONOMOUS CARS

CROSS REFERENCE TO RELATED APPLICATIONS

The present application is a national phase entry under 35 U.S.C. § 371 of International Application No. PCT/US2017/069158, filed Dec. 30, 2017, entitled "LOW-WEIGHT SINGLE MM-WAVE DIELECTRIC WAVEGUIDE INTERCONNECT ARCHITECTURE IN AUTONOMOUS CARS", which designated, among the various States, the United States of America. The Specifications of the PCT/US2017/069158 Application is hereby incorporated by reference.

FIELD OF THE INVENTION

Embodiments of the invention are in the field of semiconductor packaging and, in particular, formation of mm-wave interconnects for use in automotive applications.

BACKGROUND OF THE INVENTION

The automotive industry is rapidly progressing towards the production of autonomous and/or self-driving vehicles. Autonomous vehicles utilize many sensors that generate data regarding the position of the vehicle relative to surrounding objects, such as the road, other vehicles, traffic signals, lane markings, pedestrians, and the like. As illustrated in FIG. 1, a vehicle 100 may include any number of sensors 102, video cameras 103, and positioning systems 104, such as global positioning systems (GPS). For example, sensors 102 may include video sensors, image sensors, ultrasonic sensors, radar sensors, light detection and ranging (LIDAR) sensors, or the like. The data generated from these components needs to be processed in order to determine how the vehicle needs to react. As such, the generated data is transferred from the peripheral components to an electronic control unit (ECU) 105 over a plurality of interconnects 107. Accordingly, the additional peripheral sensors and other components needed for autonomous and/or self-driving vehicle results in a significant increase in the amount of data that is transferred within the vehicle.

Currently, autonomous vehicles that are being tested utilize data-transfers at rates between approximately 1.0 Gbps and 1.5 Gbps and employ four different low-voltage differential signaling (LVDS) lanes to allow for a total data rate between approximately 4.0 Gbps and 6.0 Gbps. However, the data rate needed in the subsequent generations of autonomous vehicles is expected to increase to approximately 10 Gbps or more (i.e., approximately 2.5 Gbps using four differential LVDS lanes). This increase in the data rate far exceeds the data rate of existing systems in currently available vehicles. For example, the standard for multimedia and infotainment networking in vehicles i.e., media oriented systems transport bus (MOST) has a data transfer rate of 150 Mbps.

Some solutions for providing high-speed interconnects include electrical interconnects and optical interconnects. However, both suffer significant drawbacks when used in the automotive industry. Electrical connections, such as ethernet, may be utilized by employing multiple lanes (i.e., cables) to reach the required bandwidth. However, this becomes increasingly expensive and power hungry to support the required data rates for short to intermediate (e.g., 5 m-10 m) interconnects needed in the automotive industry. For example, to extend the length of a cable or the given bandwidth on a cable, higher quality cables may need to be used or advanced equalization, modulation, and/or data correction techniques employed. Unfortunately, these solutions require additional power and increase the latency of the system. Latency increases are particularly problematic in autonomous vehicles due to the need to make rapid decisions (e.g., braking, avoidance maneuvers, drive train corrections, etc.) needed to ensure the safety of passengers within the vehicle and/or persons and/or property external to the vehicle.

Optical transmission over fiber is capable of supporting the required data rates and distances needed for autonomous and/or self-driving vehicles. However, the use of optical connections results in a severe power and cost penalty, especially for short to medium distances (e.g., 5 m-10 m) because of the need for conversion between optical and electrical signals. Furthermore, the alignment of optical interconnects needs to be precisely maintained. This proves to be difficult in automotive applications due to vibrations and other environmental conditions that may alter the alignment of the optical interconnects, and therefore, reduces the reliability of optical interconnects.

Accordingly, both technologies (traditional electrical and optical) are not optimal for autonomous and/or self-driving vehicles that require high data-rate, low latency, and low power interconnect lines between peripheral sensors and the ECU.

DETAILED DESCRIPTION OF THE INVENTION

Figure 1:
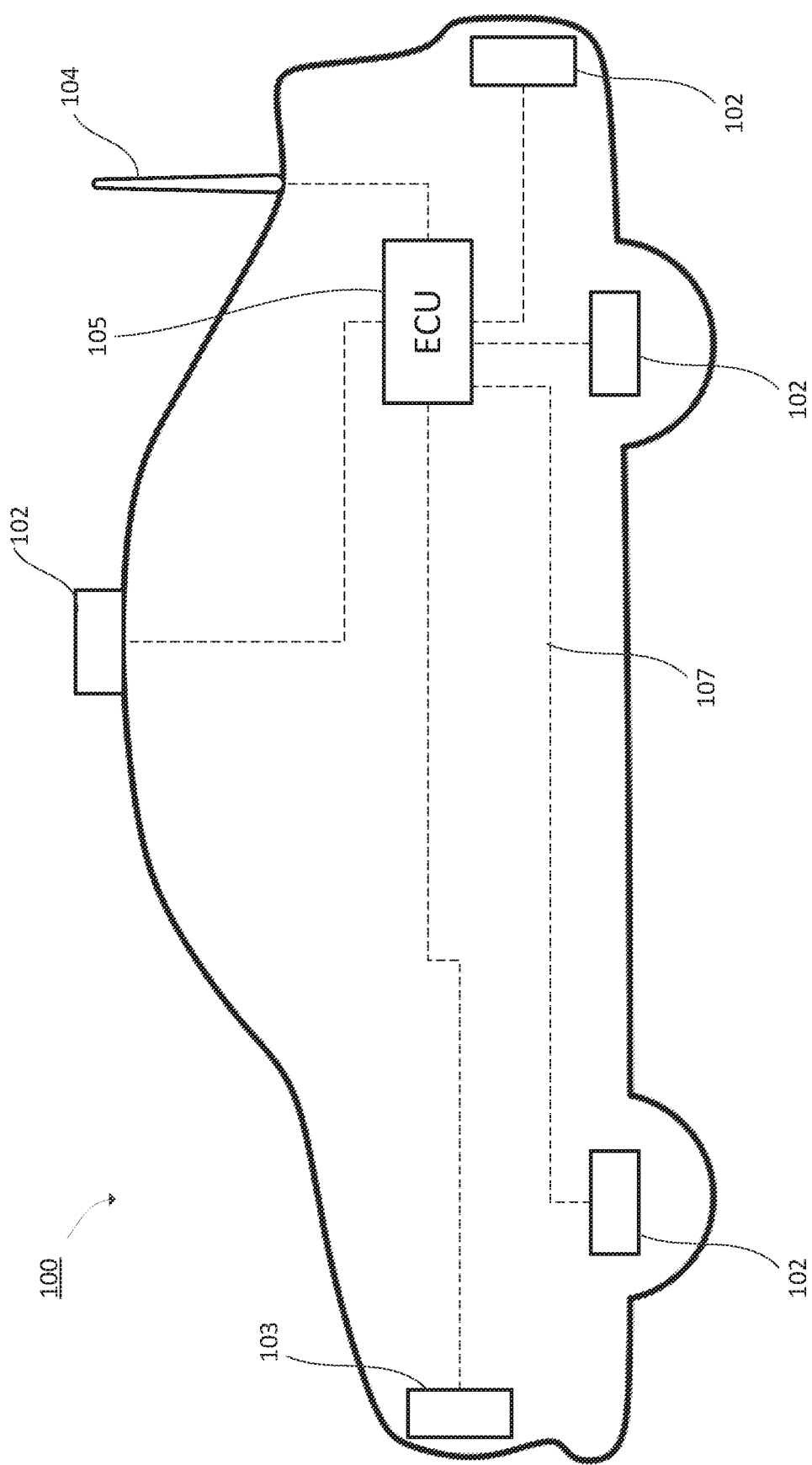
FIG. 1 is a schematic of an automobile that includes a plurality of sensors and other peripheral components that are communicatively linked to an electronic control unit (ECU).

Described herein are systems that include dielectric waveguides communicatively coupling sensor nodes to an ECU in a ring architecture that are used in autonomous and/or self-driving vehicles, according to embodiments of the invention. In the following description, various aspects of the illustrative implementations will be described using terms commonly employed by those skilled in the art to convey the substance of their work to others skilled in the art. However, it will be apparent to those skilled in the art that the present invention may be practiced with only some of the described aspects. For purposes of explanation, specific numbers, materials and configurations are set forth in order to provide a thorough understanding of the illustrative implementations. However, it will be apparent to one skilled in the art that the present invention may be practiced without the specific details. In other instances, well-known features are omitted or simplified in order not to obscure the illustrative implementations.

Various operations will be described as multiple discrete operations, in turn, in a manner that is most helpful in understanding the present invention, however, the order of description should not be construed to imply that these operations are necessarily order dependent. In particular, these operations need not be performed in the order of presentation.

As noted above, currently available interconnect solutions (i.e., electrical cables and optical cables) do not satisfy data rate, power consumption, latency, and cost targets needed for autonomous and/or self-driving vehicles (e.g., cars, trucks, trains, boats, planes, and any other autonomous transportation/cargo vehicle). Accordingly, embodiments of the invention include millimeter-wave waveguide (mm-wave waveguide) interconnect solutions. In an embodiment, the mm-wave waveguide comprises a dielectric waveguide that is made out of low loss coated or uncoated dielectric materials designed to operate in the mm-wave or sub-THz frequency range. The waveguides may be coupled at both ends to a package that includes a mm-wave engine. In short to medium length cables (e.g., 0.5-15 meters or greater), the mm-waveguide cables provide a low power, low latency, high-speed, and low cost solution. Particularly, since signals do not need to be up-converted to an optical signal, the power consumption is significantly lower than the power consumption of the alternative optical fiber interconnect technology. Additionally, in the short to medium length cables, there may be no need for error correction (EC), since achieved bit-error-rate level rates are very low (below 10E-12). Therefore, the achieved latency may be significantly lower compared to the traditional electrical interconnect especially at high data rates, where EC is needed.

Furthermore, the increased number of interconnect lines needed to connect many sensors to the ECU results in added weight and cost to the system. Particularly, when each sensor requires a dedicated interconnect line, each additional sensor increases the overall cost of the system, since a new interconnect line is needed. Additionally, each additional sensor would require an available connector at the ECU. As such, future modifications to the vehicle (e.g., to provide additional sensors, or the like) may not be possible.

Figure 2A:
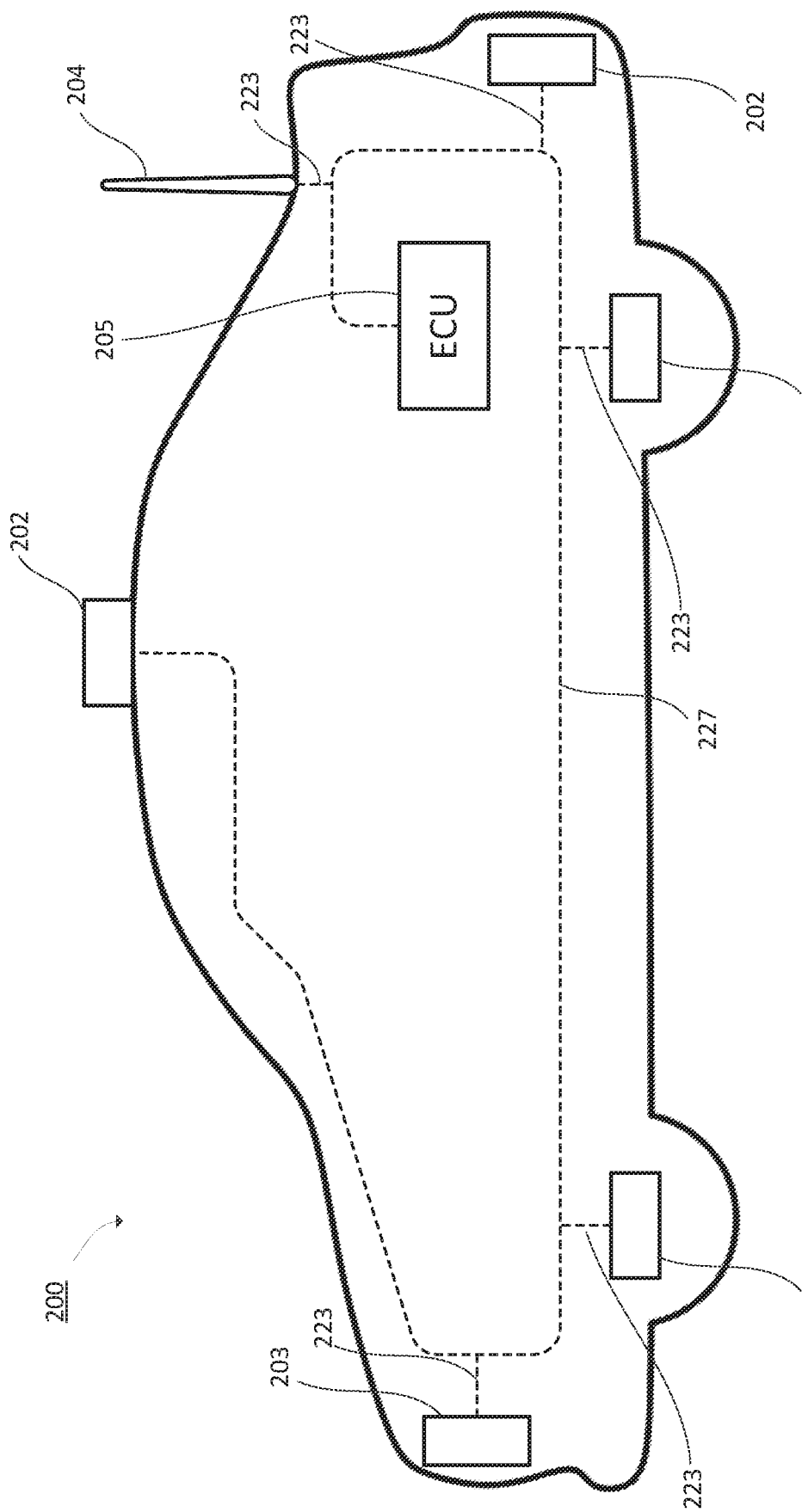
FIG. 2A is a schematic illustration of an automobile that includes a plurality of sensors that are communicatively linked to an ECU in a ring architecture, according to an embodiment of the invention.

Accordingly, embodiments of the invention include a plurality of sensors that are each are communicatively coupled with the ECU by a dielectric waveguide in a ring architecture. A schematic of such an embodiment is illustrated in FIG. 2A. As illustrated, a dielectric waveguide 227 propagates the signal from the ECU 205 to each sensor 202 or other component 203, 204. Each of the sensors are then coupled to the dielectric waveguide by link 223. As described in greater detail below, each link 223 may include a sensor node and, optionally, an electrical cable that communicatively couples the sensor 203 to the sensor node. As such, only a single dielectric waveguide 227 needs to be directly connected to the ECU 205.

Currently, communication systems such as those illustrated in FIG. 2A are simply power splitters and are not wavelength selective. Therefore, a portion of the entire signal is diverted at each power splitter. Therefore, the amount of RF power sent from the ECU is dependent on the number of sensors 202. For example, a system with four sensors 202 would require up to three power splitters. If each splitter is a 50/50 splitter, the fourth sensor in the chain would receive one-eighth of the incident power and one-fourth of the power of the first sensor 202. This requires significant additional amplification of the signal and amplifiers that work over a significant input power, hence rendering the system rather inefficient. Even if more intelligent coupler ratios are chosen, one sensor will always receive less than 1/N of the incident power.

As such, embodiments of the invention replace power splitters with sensor nodes that may be configured such that each sensor node is able to selectively remove or add a particular portion of the data stream into the signal carried over the dielectric waveguide (e.g., by using frequency-division multiplexing (FDM), time-division multiplexing (FDM), or polarization-division multiplexing (PDM)). This architecture can achieve a low-weight overall system supporting high-data rate transfers since it utilizes a single high-bandwidth dielectric waveguide in a ring topology using FDM, TDM, or PDM. Embodiments of the invention rely on the use of mm-wave RF transmitters, that up convert the low-frequency data stream generated by a sensor or the ECU, wave-launchers, diplexers, and a high-bandwidth dielectric waveguides. For example, in the FDM case, the up-converted signal of one sensor at a center frequency $f_1$ is diplexed with the signal already travelling in the dielectric waveguide (at center frequencies $f_2$, $f_3$, etc.) and launched into the dielectric waveguide again. The RF receiver chip at the ECU will de-multiplex the different bands ($f_1$, $f_2$, $f_3$, etc.) and down convert each of them in order to recover the low-frequency data stream originating from each of the sensor nodes.

The general system architecture for automotive applications has advantages such as low weight (since a dielectric waveguide has typically lower weight compared to an electrical cable supporting similar data rates and only one waveguide would be required), low cost (mainly because of lower cable-related costs) and power competitiveness. Embodiments of the invention also offer high data rates at the distances required while being a scalable solution. For example, additional RF bands can be added to accommodate additional sensors until the total bandwidth capacity of the dielectric waveguide has been reached. Furthermore, when compared to optical interconnects, mm-wave interconnects using dielectric waveguides provide an increased misalignment tolerance at the connector/waveguide interface. This would furthermore lead to lower connectorization costs when compared to the optical interconnect.

Figure 2B:
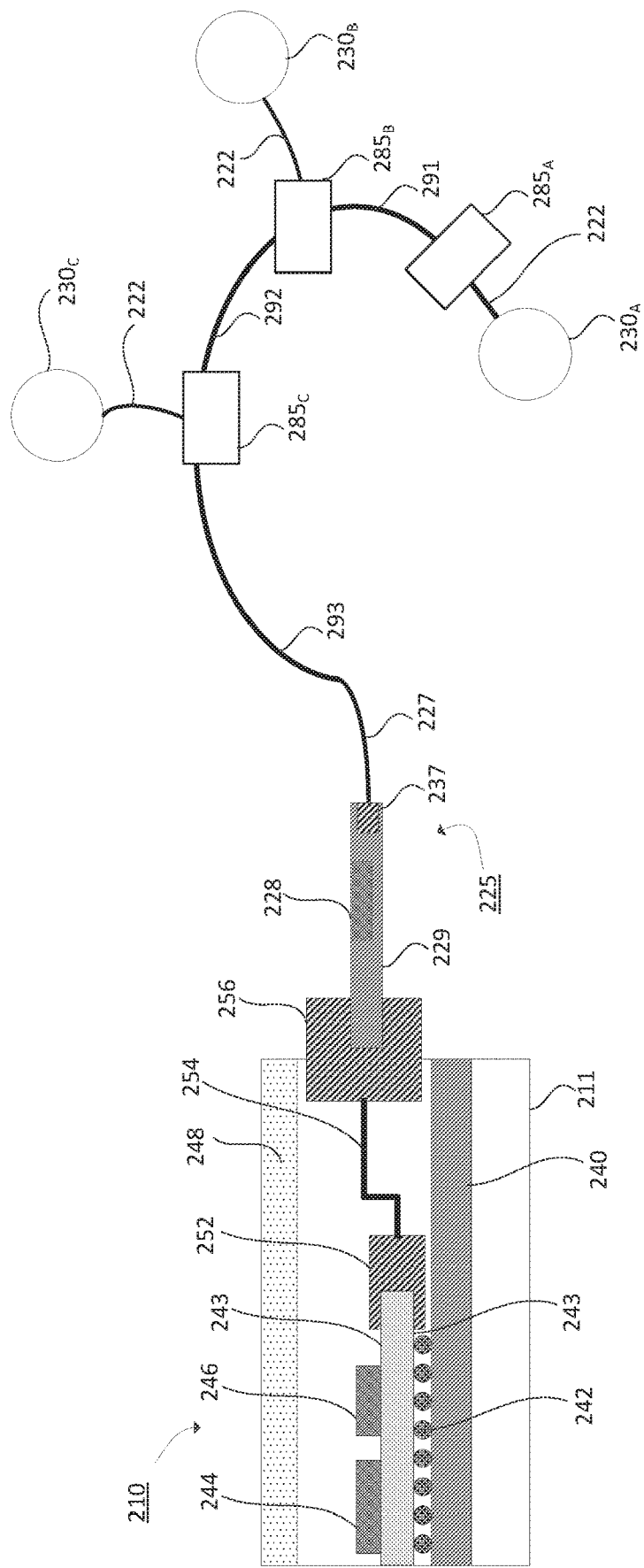
FIG. 2B is a schematic illustration of a plurality of sensor nodes coupled to an ECU in a ring architecture, according to an embodiment of the invention.

Referring now to FIG. 2B, a schematic illustration of a dielectric waveguide 227 plugged into an ECU 210 and coupled to a plurality of sensors $230_A$-$230_C$ by sensor nodes $285_A$-$285_C$ is shown, according to an embodiment of the invention. While three sensors 230 are illustrated, it is to be appreciated that any number of sensors 230 may be used so long as the bandwidth of the dielectric waveguide 227 is not exceeded. In an embodiment, the dielectric waveguide 227 may be suitable for propagating mm-wave signals. The dielectric waveguide 227 may be any suitable dielectric material, such as liquid crystal polymer (LCP), low-temperature co-fired ceramic (LTCC), high temperature co-fired ceramic (HTCC), glass, polytetrafluoroethylene (PTFE), expanded PTFE, low-density PTFE, ethylene tetrafluoroethylene (ETFE), fluorinated ethylene propylene (FEP), polyether ether ketone (PEEK), perfluoroalkoxy alkanes (PFA), combinations thereof, or the like. In an embodiment, the dielectric waveguide 227 may have any shaped cross section, including, but not limited to, rectangular (with or without rounded corners), square, circular, oval, among others. While referred to as a single dielectric waveguide, it is to be appreciated that dielectric waveguide 227 may be comprised of a plurality of distinct dielectric waveguides. For example, a first dielectric waveguide may couple the ECU 210 to a first sensor node $285_A$, and subsequent dielectric waveguides 227 may couple each of the subsequent sensor nodes 285 to each other in a ring architecture, as shown in FIG. 2B.

In an embodiment, the dielectric waveguide 227 may also include a metallic coating (not shown) to provide electrical shielding to the dielectric waveguide. In some embodiments, the metallic coating may be used as a power line. For example, power may be applied on a shield along the dielectric waveguide 227 or the electrical cables 222. While a single dielectric waveguide 227 is shown extending from a connector 225, it is to be appreciated that a bundle of two or more dielectric waveguides 227 may be coupled to the connector 225.

In an embodiment, each sensor 230 occupies a different frequency band to communicate with the ECU 210. The sensor 230 transmits data to a sensor node 285 where the data is up-converted by a transceiver and filtered. In FIG. 2B, each sensor node 285 is illustrated as a generic block, and a more detailed representation of the components of the sensor nodes 285 will be provided in greater detail below. In an embodiment, an electrical cable 222 is used to transmit the low-frequency signal to the sensor node 285. However, it is to be appreciated that the sensor 285 may be packaged directly on the sensor node 285 in some embodiments. In such embodiments, the electrical cable 222 may be omitted. After the signal has been up-converted to an RF signal and filtered, the RF signal is combined with other RF signals that already travel through the dielectric waveguide (from the other sensors 285 on other RF bands). The combined signal may then be re-launched (through a launcher and connector) onto the dielectric waveguide 227.

Figure 2C:
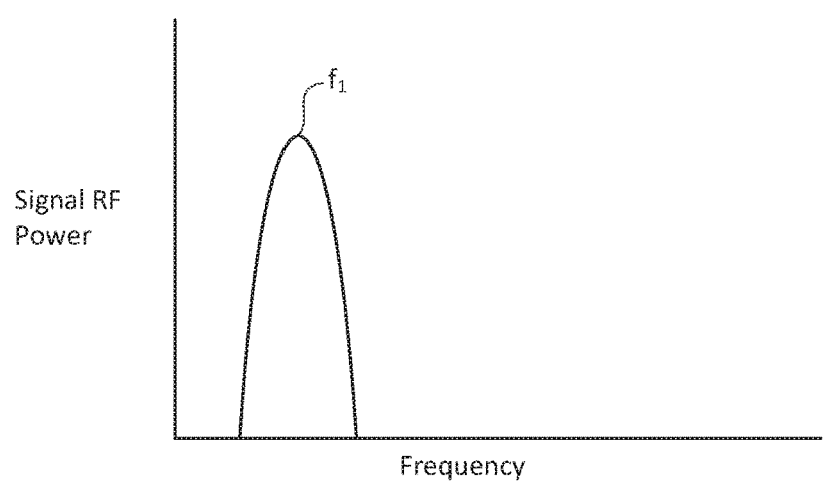
FIGS. 2C-2E are graphs illustrating the frequency bands that may be propagated along the dielectric waveguide at different locations, according to an embodiment of the invention.
Figure 2D:
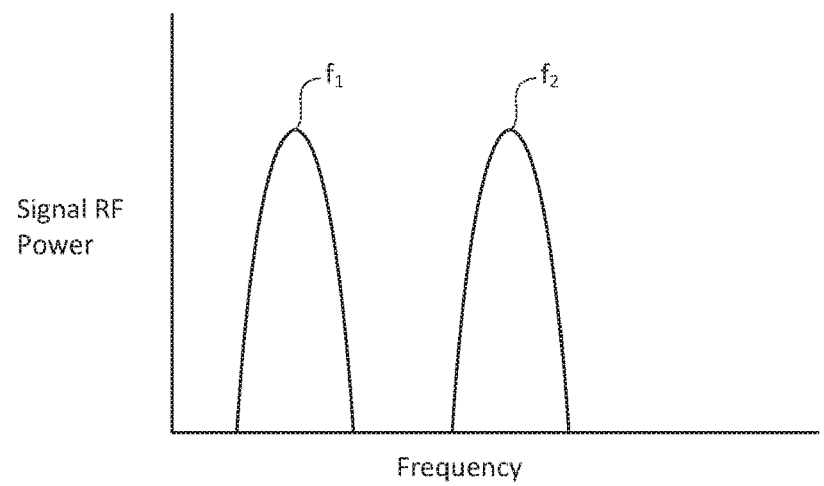
Figure 2E:
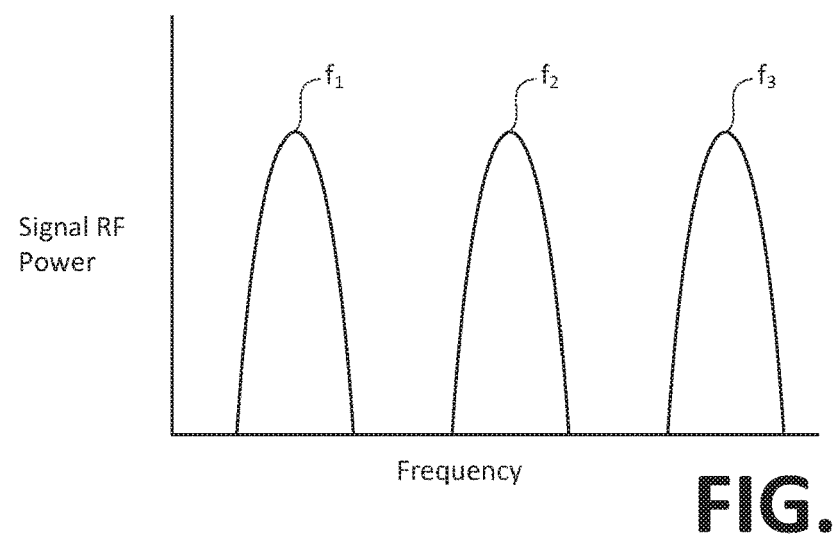

FIGS. 2C-2E illustrate the signals propagating along the dielectric waveguide 227 at various locations 291-293 that are illustrated in FIG. 2B, according to an embodiment. For example, at location 291 illustrated in FIG. 2C, a signal with a first center frequency $f_1$ is propagated along the dielectric waveguide 227 between a first sensor node $285_A$ and a second sensor node $285_B$. The signal with the first center frequency $f_1$ may be launched into the dielectric waveguide 227 by the first sensor node $285_A$. Thereafter, at location 292 illustrated in FIG. 2D, a signal with a second center frequency $f_2$ is added to the dielectric waveguide 227 between the second sensor node $285_B$ and the third sensor node $285_C$. Finally, at location 293 illustrated in FIG. 2E, a signal with a third frequency $f_3$ is added to the dielectric waveguide 227 between the third sensor node $285_C$ and the ECU 210. In the illustrated embodiments, each of the signals have a substantially similar bandwidth. However, it is to be appreciated that each signal does not need to have the same bandwidth. For example, a sensor that generates more data may have a larger frequency band allocation. Additionally, while the illustrative example includes frequency bands for FDM, other embodiments may utilize PDM, TDM, or the like in a substantially similar manner.

In an embodiment, an end of the dielectric waveguide 227 may be coupled to a connector 225 that interfaces with the ECU 210. According to an embodiment, the connector 225 includes a mm-wave engine 228 that is packaged on a mm-wave substrate 229. In an embodiment, signals from the mm-wave engine 228 may be communicatively coupled to a waveguide launcher 237 that propagates the signal into the dielectric waveguide 227. In an embodiment, the dielectric waveguide may be coupled to the launcher 237 by a connector, which is not shown in order to not obscure embodiments of the invention. While illustrated as being embedded within mm-wave packaging substrate 229, it is to be appreciated that the waveguide launcher 237 and connector may be formed at any location, including the top or bottom surface of the mm-wave packaging substrate 229. In the illustrated embodiment, the connector 225 is shown without a protective enclosure in order to not obscure the Figure. However, it is to be appreciated that the connector 225 may include multiple different packaging substrates, protective enclosures, overmolding, heat management solutions, and/or other needed components. For example, the mm-wave engine 228 may be packaged on a packaging substrate 229 and may be substantially enclosed by a protective casing. Furthermore, while the mm-wave engine 228 is illustrated as a single block, it is to be appreciated that the mm-wave engine 228 may include any number of discrete dies, interconnects, and/or other components. Additionally, while each dielectric waveguide 227 is illustrated as being connected directly to a sensor node 285, it is to be appreciated that the dielectric waveguides 227 may be coupled to the sensor node 285 by a connector (similar to the connector 225). According to an additional embodiment, the connector 225 may not include a mm-wave engine. In such embodiments, the mm-wave engine 228 may be packaged within the ECU 210 and/or sensor node 285.

In an embodiment, the ECU 210 may include a central processing unit (CPU) die 244 that is packaged on a packaging substrate 243. The packaging substrate 243 may be coupled to an ECU printed circuit board (PCB) 240 by solder bumps 242, such as a ball grid array (BGA), a land grid array (LGA), a socket, or any other known interconnect. In some embodiments, a predefined digital interconnect interface die 246 electrically coupled between CPU die 244 and the mm-wave engine 228 may also be packaged on the same packaging substrate 243 on which the CPU die 244 is packaged. For example, the predefined digital interconnect interface die 246 may translate and/or condition a signal so that signals may pass between the CPU die 244 and the mm-wave engine 228 even when the output of either of the CPU die 244 or the mm-wave engine 228 does not match the type of input expected by the other component. In some embodiments a heatsink 248 or any other thermal management technology may also be included in the ECU 210. For example, the heatsink 248 may be a liquid cooled heatsink 248, such as one that is connected to the cooling systems in the autonomous vehicle. In the illustrated embodiment, the heatsink 248 is formed over a surface of an ECU enclosure 211. However, the heatsink 248 may be within the ECU enclosure 211 in some embodiments of the invention.

Embodiments of the invention may include a predefined interface 252 that couples the CPU packaging substrate 243 to a first end of an internal cable 254. The internal cable 254 may extend to the edge of the ECU enclosure 211 where it is coupled to an external predefined interface 256. The external predefined interface 256 may be any suitable interface. For example, the external predefined interface 256 may be a SFP, a QSFP, or the like.

Figure 3A:
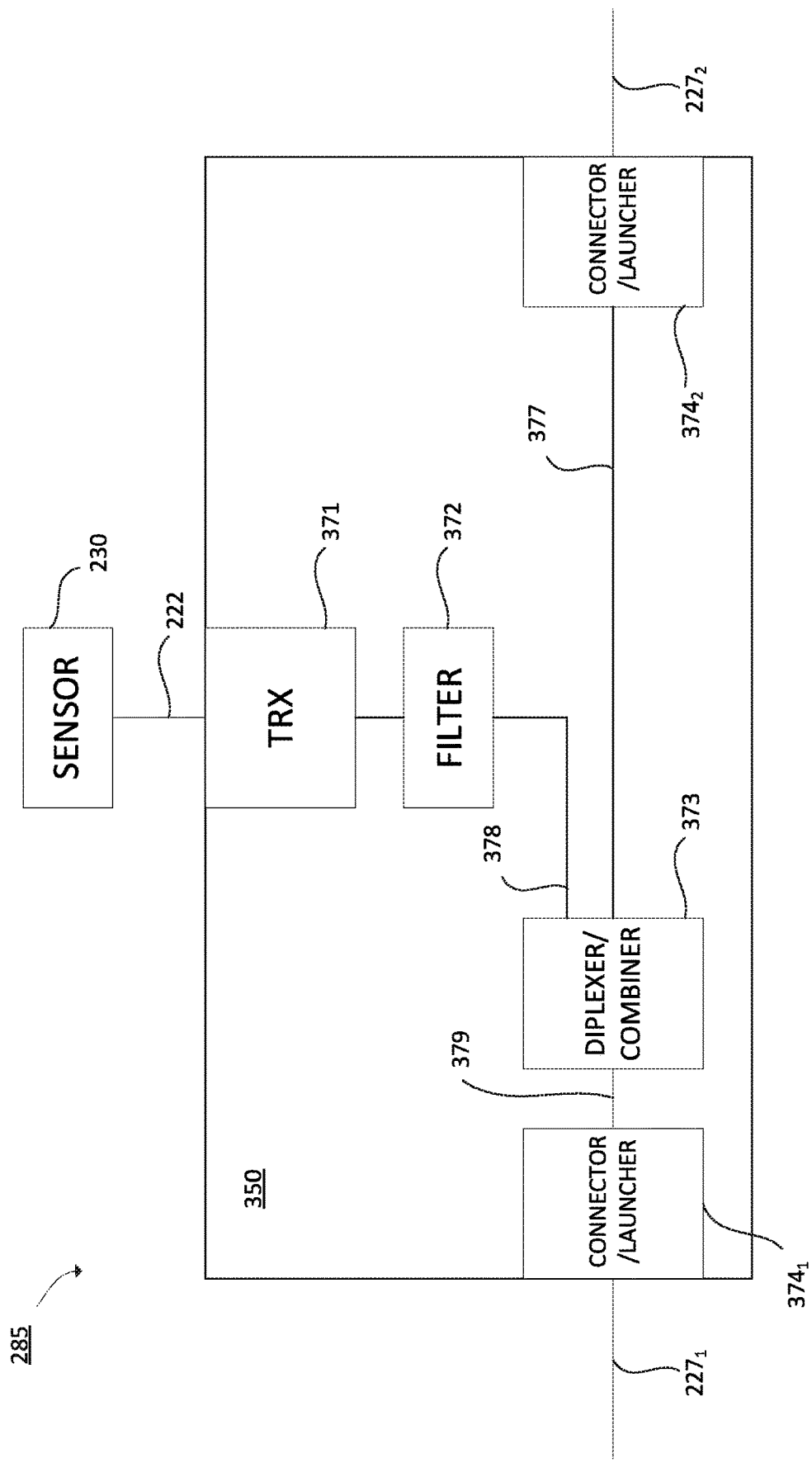
FIG. 3A is a schematic of a passive sensor node, according to an embodiment of the invention.

Referring now to FIG. 3A, a schematic illustration of a sensor node 285 is shown in greater detail, according to an embodiment of the invention. In an embodiment, the sensor node 285 may be fabricated on a package substrate 350. The package substrate 350 may be any suitable substrate and may include an enclosure or other protective covering (not shown). In the illustrated embodiment, the sensor node 285 is connected to the sensor 230 by an electrical cable 222. However, it is to be appreciated that the sensor node 285 and the sensor 230 may be co-located on the same packaging substrate 350, and the electrical cable 222 may be omitted. According to an embodiment, the sensor node 285 includes only passive components. As such, no additional power needs to be consumed in order to process RF signals and propagate them along the dielectric waveguides 227.

In an embodiment, the sensor node 285 is coupled to two dielectric waveguides 227. A first dielectric waveguide $227_1$ may be coupled to a first connector/launcher block $374_1$. The first connector/launcher block $374_1$ includes hardware for physically coupling the first dielectric waveguide $227_1$ to the sensor node 285 and a launcher may launch and assist the propagation of the mm-wave signal along the first dielectric waveguides $227_1$. The launcher may be any known launcher for initiating the propagation of mm-waves or receiving mm-waves, such as a regular patch launcher, a stacked-patch launcher, a microstrip-to-slot transition launcher, etc. Similarly, a second dielectric waveguide $227_2$ may be coupled to the sensor node 285 by a second connector launcher block $374_2$ that is substantially similar to the first connector/launcher block $374_1$.

In an embodiment, the first dielectric waveguide $227_1$ may be communicatively coupled to a diplexer/combiner block 373 by the first connector/launcher block $374_1$ and trace 379. The diplexer/combiner block 373 may be used to add signals from the sensor 230 to the first dielectric waveguide $227_1$ or to diplex a signal transmitted from the ECU over the first dielectric waveguide $227_1$ that contains the desired frequency for communicating with the sensor 230. For example, a signal propagated along the second dielectric waveguide $227_2$ may be received by the second connector/launcher block $374_2$ and transmitted to the diplexer/combiner block 373 along line 377. The signal from the sensor 230 may be transmitted to a transceiver 371 where it is up-converted to a mm-wave RF signal by a mm-wave engine. The up-converted signal may then optionally be filtered at filter 372 and transmitted to the diplexer/combiner block 373 along line 378, where it will be combined with the signal obtained from the second dielectric waveguide $227_2$. Note that, for some embodiments, the filter 372 may be omitted when using a diplexer, but not when using a splitter/combiner. In an embodiment, the diplexer/combiner block 373 may then transmit the signal along line 379 to the first connector/launcher block which then propagates the combined signal along the first dielectric waveguide $227_1$.

According to an embodiment, the size of the sensor node 285 may be dependent on the frequency of operation. In an embodiment, the signals may include a plurality of bands that occupy frequencies between approximately 30 GHz and 300 GHz. Embodiments may include frequency bands that provide data rates between approximately 1 Gbps and 10 Gbps. For example, at an operating frequency of approximately 60 GHz, the physical area needed for components, such as the diplexer/combiner block 373 (e.g., a substrate integrated waveguide (SIW) diplexer/combiner or a transmission line diplexer/combiner) may be approximately 3 mm×3 mm or smaller. Accordingly, the space occupied by the sensor node 285 is not significant in relation to the overall size of the vehicle. In an embodiment, the filter 372 and/or diplexer/combiner may be designed using passive components such as transmission lines in a hairpin pattern, a zig-zag pattern, coupled microstrip lines, or the like. Additional embodiments may also include open loop resonators for the design of the diplexer/combiner 373. In an embodiment, the package substrate 350 may include a plurality of dielectric layers. The dielectric layers may separate layers of transmission lines used to form the components illustrated in FIG. 3A. For example, the dielectric layers may be any suitable layers and may have thicknesses between approximately 10 μm-300 μm.

The sensor node 285 illustrated in FIG. 3A may be referred to as a passive sensor node (without accounting for the transceiver 371). As such, each of the components do not require additional power in order to filter and/or otherwise process the signals that pass through them. Accordingly, such embodiments may suffer signal power dissipation as more sensor nodes are added to the system. In such instances, the power of the signal originating at the ECU may need to be amplified when the length of the dielectric waveguide 227 extends beyond approximately 10 m and/or the number of sensor nodes is increased.

Figure 3B:
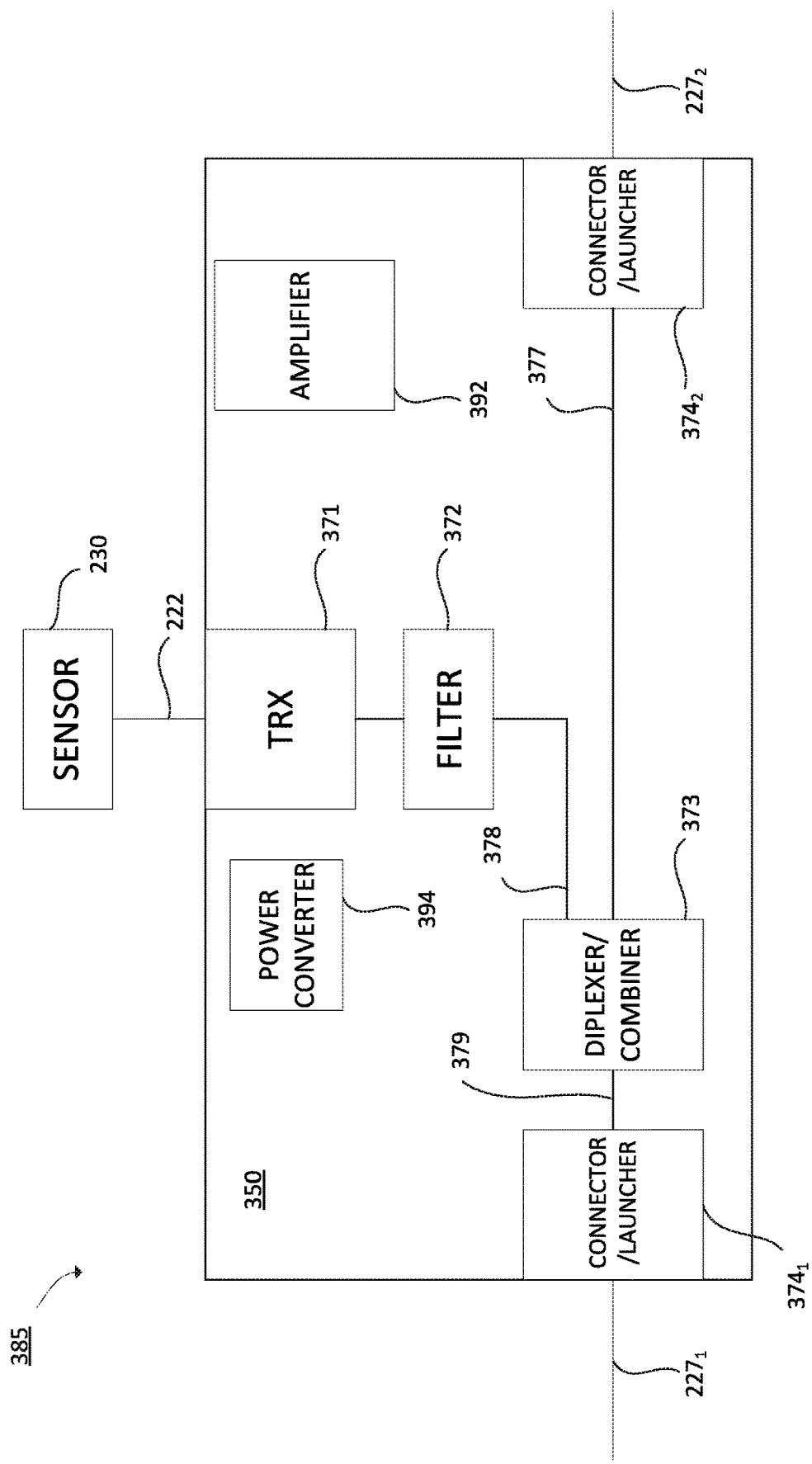
FIG. 3B is a schematic of an active sensor node, according to an embodiment of the invention.

Accordingly, alternative embodiments may also utilize active sensor nodes in order to eliminate issues with increased signal insertion loss. In such embodiments, one or more of the sensor nodes 285 in the ring architecture may include an amplifier in order to boost the signal power before relaunching the signal into the next portion of the dielectric waveguide. FIG. 3B is a schematic illustration of an active sensor node 385, according to an embodiment of the invention.

The active sensor node 385 illustrated in FIG. 3B is substantially similar to the passive sensor node 285 illustrated in FIG. 3A, with the exception that additional passive and active components may be included. For example, the active sensor node 385 may also include an amplifier 392 and optionally a power converter 394. In an embodiment, the amplifier 392 may locally boost the RF signals in order to compensate for the losses incurred by the passive diplexer/combiner 373 and/or the filter 372. In order to provide the power to the sensor node 385 needed to operate the amplifier 392, power may be delivered over the dielectric waveguide 227. For example, a conductive shield surrounding the dielectric waveguide may be used as a power line to transmit power from the ECU 210 to the sensor node 385.

In an embodiment, the amplifiers are not two-way/bidirectional devices. Accordingly, during receive time (i.e., a signal sent from the ECU 210 to the sensor 230) the amplifier 392 may be switched off/bypassed so that it does not impede communication. Alternative embodiments may also include reversible amplifiers 392 (e.g., dual amplifiers) that may be switched to amplify depending on the communication state (i.e., whether the transceiver is in an RX mode or a TX mode).

In an embodiment, each sensor node 385 in the ring architecture may include an amplifier 392. However, it is to be appreciated that not all sensor nodes are required to be active sensor nodes 385. For example, every other sensor node may be an active sensor node 385, only one sensor node may be an active sensor node 385, or any other combination of active sensor nodes 385 and passive sensor nodes 285 may be used depending on the number of sensors used, the losses in the system, the length of the dielectric waveguide, or any other desired design consideration.

Furthermore, active sensor nodes 385 may also include power converters 394, according to an embodiment of the invention. The inclusion of power converters 394 on the active sensor nodes 385 may allow for different power domains to be created on different sensor nodes in order to deliver a desired voltage to the sensor 230 connected to each sensor node 385. As such, the need of transferring multiple power domains over the waveguide to accommodate sensors operating at different voltages is eliminated. This allows flexibility with design and selection of sensors 230 in the system, because each sensor 230 does not need to operate at the same voltage levels. Accordingly, such a system may be considered sensor agnostic. For example, the power converters 394 on each sensor node 385 may include an LDO or DC2DC converter to create the voltage level needed by the sensor.

While the active sensor node 385 in FIG. 3B is illustrated as including both an amplifier 392 and a power converter 394, embodiments are not limited to such configurations. For example, an active sensor node 385 may include either an amplifier 392 only or a power converter 394 only. Additionally, not all active sensor nodes 385 in a system are required to have the same components. For example, some active sensor nodes 385 may include an amplifier 392 and a power converter 394, and other active sensor nodes 385 may include only a power converter 394. Similarly, some active sensor nodes 385 may include an amplifier 392 and a power converter 394, and other active sensor nodes 385 may include only an amplifier 392.

Figure 4:
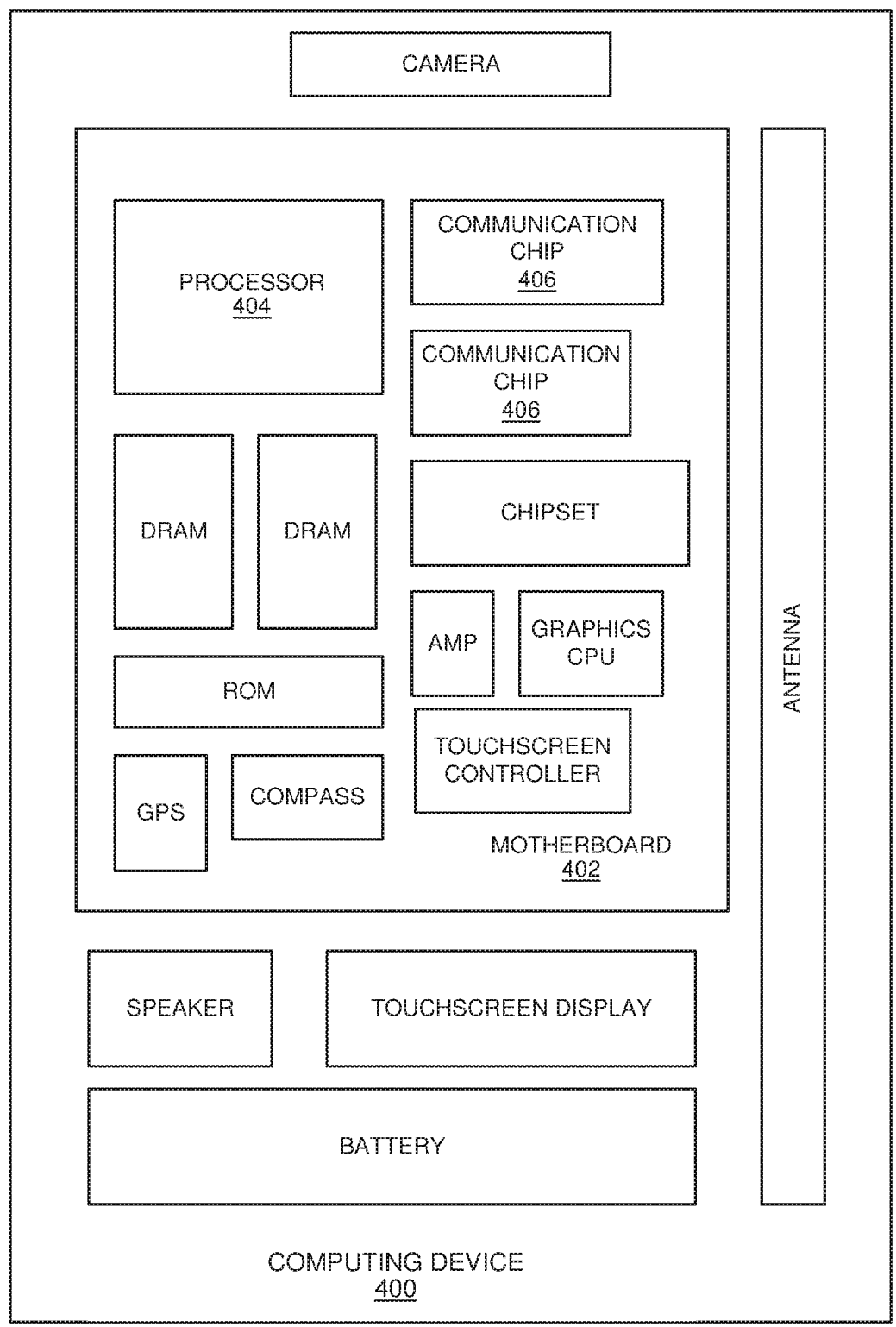
FIG. 4 is a schematic of a computing device built in accordance with an embodiment of the invention.

FIG. 4 illustrates a computing device 400 in accordance with one implementation of the invention. The computing device 400 houses a board 402. The board 402 may include a number of components, including but not limited to a processor 404 and at least one communication chip 406. The processor 404 is physically and electrically coupled to the board 402. In some implementations the at least one communication chip 406 is also physically and electrically coupled to the board 402. In further implementations, the communication chip 406 is part of the processor 404. In yet another implementation, the communication chip 406 may function as a predefined interface (e.g., a serializer/deserializer, or the like).

Depending on its applications, computing device 400 may include other components that may or may not be physically and electrically coupled to the board 402. These other components include, but are not limited to, volatile memory (e.g., DRAM), non-volatile memory (e.g., ROM), flash memory, a graphics processor, a digital signal processor, a crypto processor, a chipset, an antenna, a display, a touchscreen display, a touchscreen controller, a battery, an audio codec, a video codec, a power amplifier, a global positioning system (GPS) device, a compass, an accelerometer, a gyroscope, a speaker, a camera, and a mass storage device (such as hard disk drive, compact disk (CD), digital versatile disk (DVD), and so forth).

The communication chip 406 enables wireless communications for the transfer of data to and from the computing device 400. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 406 may implement any of a number of wireless standards or protocols, including but not limited to Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, derivatives thereof, as well as any other wireless protocols that are designated as 3G, 4G, 5G, and beyond. The computing device 400 may include a plurality of communication chips 406. For instance, a first communication chip 406 may be dedicated to shorter range wireless communications such as Wi-Fi and Bluetooth and a second communication chip 406 may be dedicated to longer range wireless communications such as GPS, EDGE, GPRS, CDMA, WiMAX, LTE, Ev-DO, and others.

The processor 404 of the computing device 400 includes an integrated circuit die packaged within the processor 404. In some implementations of the invention, the integrated circuit die of the processor may be packaged on an organic substrate and provide signals that are converted to a mm-wave signal and propagated along a dielectric waveguide to a plurality of sensor nodes arranged in a ring architecture, in accordance with implementations of the invention. The term "processor" may refer to any device or portion of a device that processes electronic data from registers and/or memory to transform that electronic data into other electronic data that may be stored in registers and/or memory.

The communication chip 406 also includes an integrated circuit die packaged within the communication chip 406. In accordance with another implementation of the invention, the integrated circuit die of the communication chip may be packaged on an organic substrate and provide signals that are converted to a mm-wave signal and propagated along a dielectric waveguide to a plurality of sensor nodes arranged in a ring architecture, in accordance with implementations of the invention.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize.

These modifications may be made to the invention in light of the above detailed description. The terms used in the following claims should not be construed to limit the invention to the specific implementations disclosed in the specification and the claims. Rather, the scope of the invention is to be determined entirely by the following claims, which are to be construed in accordance with established doctrines of claim interpretation.

The following examples pertain to further embodiments. The various features of the different embodiments may be variously combined with some features included and others excluded to suit a variety of different applications.

The following examples pertain to further embodiments:

Example 1 is a sensor node, comprising a package substrate; a diplexer/combiner block on the package substrate; a transceiver communicatively coupled to the diplexer/combiner block; and a first mm-wave launcher coupled to the diplexer/combiner block.

In Example 2, the subject matter of example 2 can optionally include further comprising a sensor communicatively coupled to the transceiver.

In Example 3, the subject matter of any of examples 1-2 can optionally include the sensor communicatively coupled to the transceiver by an electrical cable.

In Example 4, the subject matter of any of examples 1-3 can optionally include the sensor located on the package substrate.

In Example 5, the subject matter of any of examples 1-4 can optionally include further comprising a filter communicatively coupled to the diplexer/combiner block; and the transceiver communicatively coupled to the filter.

In Example 6, the subject matter of any of examples 1-5 can optionally include the sensor operating at a frequency band for communicating with an electronic control unit (ECU) communicatively coupled to the sensor node.

In Example 7, the subject matter of any of examples 1-6 can optionally include the filter substantially removing frequencies from RF signals other than the frequency band of the sensor.

In Example 8, the subject matter of any of examples 1-7 can optionally include the frequency band having a data rate between 1 Gbps and 10 Gbps.

In Example 9, the subject matter of any of examples 1-8 can optionally include the diplexer/combiner block coupled to a first dielectric waveguide.

In Example 10, the subject matter of any of examples 1-9 can optionally include the first dielectric waveguide coupled to the package substrate by a waveguide connector. A second mm-wave launcher is communicatively coupled between the first dielectric waveguide and the diplexer/combiner block.

In example 11, the subject matter of any of examples 1-10 can optionally include further comprising a second dielectric waveguide communicatively coupled to the first mm-wave launcher by a waveguide connector.

In example 12, the subject matter of any of examples 1-11 can optionally include the first mm-wave launcher and the second mm-wave launcher are single layer patch launchers, stacked-patch launchers, or microstrip-to-slot transition launchers.

In example 13, the subject matter of example 1 can optionally include the filter and/or the diplexer/combiner block are formed with passive components such as transmission lines in a hairpin pattern, a zig-zag pattern, coupled u-strip lines, and/or open loop resonators.

Example 14 is an active sensor node, comprising a package substrate; a diplexer/combiner block on the package substrate; a transceiver communicatively coupled to the diplexer/combiner block; a sensor communicatively coupled to the transceiver; a first mm-wave launcher coupled to the diplexer/combiner block; a first dielectric waveguide coupled to the first mm-wave launcher; a second mm-wave launcher coupled to the diplexer/combiner; and an amplifier.

In example 15, the subject matter of example 14 can optionally include further comprising a dielectric waveguide coupled to the second mm-wave launcher. The dielectric waveguide includes a power line.

In example 16, the subject matter of any of examples 14-15 can optionally include the powerline as a conductive material surrounding the dielectric waveguide.

In example 17, the subject matter of any of examples 14-16 can optionally include the powerline transmitting power from an ECU to the sensor node.

In example 18, the subject matter of example 14 can optionally include the amplifier as a reversible amplifier.

In example 19, the subject matter of any of example 14 can optionally include further comprising a power converter; a filter communicatively coupled to the diplexer/combiner block; and the transceiver communicatively coupled to the filter.

In example 20, the subject matter of any of examples 14-19 can optionally include the power converter as an LDO or DC2DC power converter.

In example 21, the subject matter of any of examples 14-20 can optionally include the power converter converting an incoming voltage to a voltage that the sensor uses for operation.

Example 22 is a vehicle including a communication system, comprising an electronic control unit (ECU); a plurality of dielectric waveguides, wherein a first dielectric waveguide is communicatively coupled to the ECU; a plurality of sensor nodes. A first sensor node is communicatively coupled to the ECU by the first dielectric waveguide. Each of the subsequent sensor nodes are coupled to each other in a ring architecture by additional dielectric waveguides. Each sensor node comprises a package substrate; a diplexer/combiner block on the package substrate; a first mm-wave launcher coupled to the diplexer/combiner block. The first mm-wave launcher is also communicatively coupled to one of the plurality of dielectric waveguides; a transceiver communicatively coupled to the diplexer/combiner block; and a second mm-wave launcher coupled to the diplexer/combiner block. The second mm-wave launcher is communicatively coupled to one of the plurality of dielectric waveguides; and; a plurality of sensors. Each sensor is communicatively coupled to different ones of the transceivers. Each sensor communicates with the ECU over a different frequency band.

In example 23, the subject matter of example 22 can optionally include further comprising a filter communicatively coupled to the diplexer/combiner block; and the transceiver communicatively coupled to the filter. The filter on each sensor node filters out frequencies other than the frequency band of the sensor to which the sensor node is coupled.

In example 24, the subject matter of any of examples 22-23 can optionally one or more of the plurality of sensor nodes are active sensor nodes. The active sensor nodes further comprise a primary electronic circuit including an amplifier. The plurality of dielectric waveguides include a powerline to provide power to one or more of the sensor nodes.

In example 25, the subject matter of any of examples 22-24 can optionally include one or more of the active sensor nodes further comprise a power converter. The power converter converts a voltage from the power lines to a voltage suitable to the sensor coupled to the active sensor.

What is claimed is:

1. A sensor node, comprising:
   a package substrate;
   a diplexer/combiner block on the package substrate;
   a transceiver communicatively coupled to the diplexer/combiner block;
   a first millimeter (mm)-wave launcher coupled to the diplexer/combiner block; and
   a second mm-wave launcher coupled to the diplexer/combiner block.

2. The sensor node of claim 1, further comprising a sensor communicatively coupled to the transceiver.

3. The sensor node of claim 2, wherein the sensor is communicatively coupled to the transceiver by an electrical cable.

4. The sensor node of claim 2, wherein the sensor is located on the package substrate.

5. The sensor node of claim 1, further comprising:
   a filter communicatively coupled to the diplexer/combiner block; and
   the transceiver communicatively coupled to the filter.

6. The sensor node of claim 2, wherein the sensor operates at a frequency band for communicating with an electronic control unit (ECU) communicatively coupled to the sensor node.

7. The sensor node of claim 6, wherein the filter substantially removes frequencies from RF signals other than the frequency band of the sensor.

8. The sensor node of claim 6, wherein the frequency band has a data rate between 1 Gbps and 10 Gbps.

9. The sensor node of claim 1, wherein the diplexer/combiner block is coupled to a first dielectric waveguide.

10. The node of claim 9, wherein the first dielectric waveguide is coupled to the package substrate by a waveguide connector, and wherein the second mm-wave launcher is communicatively coupled between the first dielectric waveguide and the diplexer/combiner block.

11. The sensor node of claim 10, further comprising a second dielectric waveguide communicatively coupled to the first mm-wave launcher by the waveguide connector or another waveguide connector.

12. The sensor node of claim 11, wherein the first mm-wave launcher is as single layer patch launcher, stacked-patch launcher, or microstrip-to-slot transition launcher, and the second mm-wave launcher is a single layer patch launcher, stacked-patch launcher, or microstrip-to-slot transition launcher.

13. The sensor node of claim 1, wherein a filter and/or the diplexer/combiner block are formed with passive components including transmission lines in one or more of a hairpin pattern, a zig-zag pattern, coupled u-strip lines, and/or open loop resonators.

14. An active sensor node, comprising:
a package substrate;
a diplexer/combiner block on the package substrate;
a transceiver communicatively coupled to the diplexer/combiner block;
a sensor communicatively coupled to the transceiver;
a first mm-wave launcher coupled to the diplexer/combiner block;
a first dielectric waveguide coupled to the first mm-wave launcher;
a second mm-wave launcher coupled to the diplexer/combiner; and
an amplifier.

15. The active sensor node of claim 14, further comprising a dielectric waveguide coupled to the second mm-wave launcher, wherein the dielectric waveguide includes a power line.

16. The active sensor node of claim 15, wherein the powerline is a conductive material surrounding the dielectric waveguide.

17. The active sensor node of claim 16, wherein the powerline transmits power from an electronic control unit (ECU) to the sensor node.

18. The active sensor node of claim 14, wherein the amplifier is a reversible amplifier.

19. The active sensor node of claim 14, further comprising:
a power converter;
a filter communicatively coupled to the diplexer/combiner block; and
the transceiver communicatively coupled to the filter.

20. The active sensor node of claim 19, wherein the power converter is an LDO or a DC2DC power converter.

21. The active sensor node of claim 19, wherein the power converter converts an incoming voltage to a voltage that the sensor uses for operation.

22. A vehicle including a communication system, comprising:
an electronic control unit (ECU);
a plurality of dielectric waveguides, wherein a first dielectric waveguide is communicatively coupled to the ECU;
a plurality of sensor nodes, wherein a first sensor node is communicatively coupled to the ECU by the first dielectric waveguide, and each of the subsequent sensor nodes are coupled to each other in a ring architecture by additional dielectric waveguides, wherein each sensor node comprises:
a package substrate;
a diplexer/combiner block on the package substrate;
a first mm-wave launcher coupled to the diplexer/combiner block, wherein the first mm-wave launcher is also communicatively coupled to one of the plurality of dielectric waveguides;
a plurality of transceivers communicatively coupled to the diplexer/combiner block;
a second mm-wave launcher coupled to the diplexer/combiner block, wherein the second mm-wave launcher is communicatively coupled to one of the plurality of dielectric waveguides; and
a plurality of sensors, wherein each sensor is communicatively coupled to different ones of the plurality of transceivers, and wherein each sensor communicates with the ECU over a different frequency band.

23. The vehicle of claim 22, further comprising:
a filter communicatively coupled to the diplexer/combiner block; and
the transceiver communicatively coupled to the filter, wherein the filter on each sensor node filters out frequencies other than the frequency band of the sensor to which the sensor node is coupled.

24. The vehicle of claim 23, wherein the one or more of the plurality of sensor nodes are active sensor nodes, wherein the active sensor nodes further comprise a primary electronic circuit including an amplifier, and wherein the plurality of dielectric waveguides include a powerline to provide power to one or more of the sensor nodes.

25. The vehicle of claim 24, wherein one or more of the active sensor nodes further comprise a power converter, wherein the power converter converts a voltage from the powerline to a voltage suitable to the sensor coupled to the active sensor node.

* * * * *